United States Patent [19]
Geibl et al.

[11] Patent Number: 5,217,823
[45] Date of Patent: Jun. 8, 1993

[54] EXPLOSION RESISTANT VENT CAP

[75] Inventors: Matthias Geibl, Germantown; Guy D. McDonald, Shorewood; Colleen M. Hays, Greendale, all of Wis.

[73] Assignee: Globe-Union Inc., Milwaukee, Wis.

[21] Appl. No.: 805,578

[22] Filed: Dec. 10, 1991

[51] Int. Cl.[5] .............................................. H01M 2/12
[52] U.S. Cl. ........................................ 429/55; 429/57; 429/86; 429/87
[58] Field of Search ..................... 429/54, 55, 87, 89, 429/57, 86

[56] References Cited

U.S. PATENT DOCUMENTS

| | | | |
|---|---|---|---|
| 2,670,396 | 2/1954 | Field | 429/55 |
| 3,536,536 | 10/1970 | Lucas | 429/55 |
| 4,098,963 | 7/1978 | Mocas | 429/89 X |
| 4,751,154 | 6/1988 | Binder et al. | 429/86 X |

FOREIGN PATENT DOCUMENTS 644420 10/1950 United Kingdom ................ 429/87

Primary Examiner—Stephen Kalafut
Attorney, Agent, or Firm—Foley & Lardner

[57] ABSTRACT

A vent cap for use in a recombinant battery which includes a hollow barrel configured for gas-tight insertion into a vent hole in a battery cover. A retaining flange is formed at the closed end of the barrel, and a one-way relief valve formed on the barrel near its closed end. A layer of a polyalkylene explosion attenuating material surrounds the outside of the barrel below the flange and surrounding the relief valve. The polyalkylene material provides effective attenuation of explosions that occur in the vicinity of the relief valve. The invention further provides a vent cap assembly wherein the foregoing vent cap is mounted on a plastic vent cover of an otherwise conventional battery container.

13 Claims, 1 Drawing Sheet

EXPLOSION RESISTANT VENT CAP

FIELD OF THE INVENTION

This invention relates to vent systems used in automotive batteries, particularly to vent caps used in sealed, recombinant lead-acid batteries.

BACKGROUND OF THE INVENTION

Conventional lead-acid vehicle batteries comprise a number of cells disposed in a container. A series of alternating positive and negative electrodes (plates), having separators sandwiched therebetween, are disposed in each cell and immersed in aqueous sulfuric acid electrolyte. The positive plate contains lead oxide disposed on a lead alloy grid. The negative plate contains lead as the electroactive material on a lead alloy grid.

In lead-acid batteries, gases are often liberated from the electrolyte during the charge and discharge reactions. Factors such as high current charge and discharge conditions, and changes in temperature, can affect the rate at which these gases are produced. To avoid excessive gas pressure buildup which can lead to electrolyte leaks, housing failure, and possibly explosion, it is desirable to vent the high pressure regions within the battery. Due to the volatile nature of these gases, it is desirable to prevent the collection of any substantial amount of these gases.

The vent systems of sealed lead-acid batteries release gases intermittently as the pressure builds up internally during charging or discharging. Hydrogen and oxygen gas tends to accumulate in the space around the vent in the battery vent well external to the battery cell. If enough hydrogen and oxygen gases accumulate, there exists the chance of an explosion due to a spark external to the cell. In some vent constructions, evolved gases pass radially from a central barrel past a one-way relief valve in the form of a flexible band fitted about a hole through the wall of the barrel. See, for example, Gates U.S. Pat. No. 3,862,861, issued Apr. 7, 1987 and Sonnenshein U.S. Pat. No. 3,257,237 issued June, 1966 and U.S. Pat. No. 3,765,942, issued Oct. 16, 1973.

Other patents owned by a common assignee address the problem of preventing battery explosions by providing an explosion attenuating material of closely packed pillows made of a foam or a fibrous material such as polypropylene. See Binder et al. U.S. Pat. No. 4,751,154, issued Jun. 14, 1988, and U.S. Pat. No. 4,859,546, issued Aug. 22, 1989.

An apparatus is needed which reduces the amount of hydrogen and oxygen gases which can collect in the vent cap area so that the danger of explosion from an external flame or spark is reduced. A known device like that shown in FIG. 1 has been used, either with an empty space surrounding the vent barrel, or with a polyester foam filler. Neither arrangement provided explosion attenuation. Polyester, while more useful than no foam at all, burned too readily. Accordingly, a need persists for a battery vent construction wherein the space outside the relief valve between the vent cap and battery cover has an effective explosion attenuation device.

SUMMARY OF THE INVENTION

The present invention provides a vent cap for use in a recombinant battery which includes a hollow barrel configured for gas-tight insertion into a vent hole in a battery cover, the barrel having an open end and a closed end, a retaining flange formed at the closed end of the barrel, a one-way relief valve formed on the barrel near the closed end thereof, and a layer of a polyalkylene explosion attenuating material surrounding the outside of the barrel below the flange and in contact with the flange, and surrounding the relief valve. The polyalkylene material provides effective attenuation of explosions that occur in the vicinity of the relief valve. The invention further provides a vent cap assembly wherein the foregoing vent cap is mounted on a plastic vent cover of an otherwise conventional battery container. Other features and advantages of the invention will become apparent to those skilled in the art upon review of the following drawing, detailed description and claims.

BRIEF DESCRIPTION OF THE DRAWINGS

A preferred embodiment of the invention is shown in the appended drawings, wherein like numerals denote like elements, and.

DETAILED DESCRIPTION OF PREFERRED EXEMPLARY EMBODIMENT

The vent cap of the present invention is discussed in the context of a typical recombinant automotive battery in which venting is desired only when excessive pressure develops within the battery. Those skilled in the art will appreciate that the subject vent system may be used in conjunction with any suitable battery which evolves flammable gases such as hydrogen and oxygen in which a one way relief valve may be used.

Figure 2:
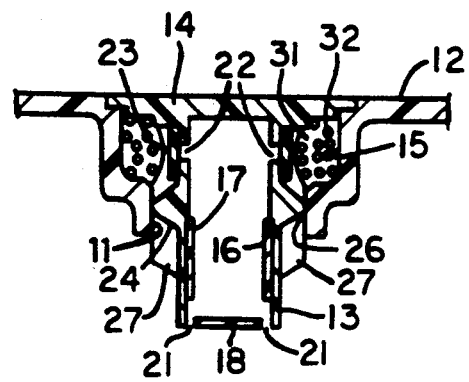
FIG. 2 is cross-sectional view taken along the line 2—2 in FIG. 1.
Figure 1:
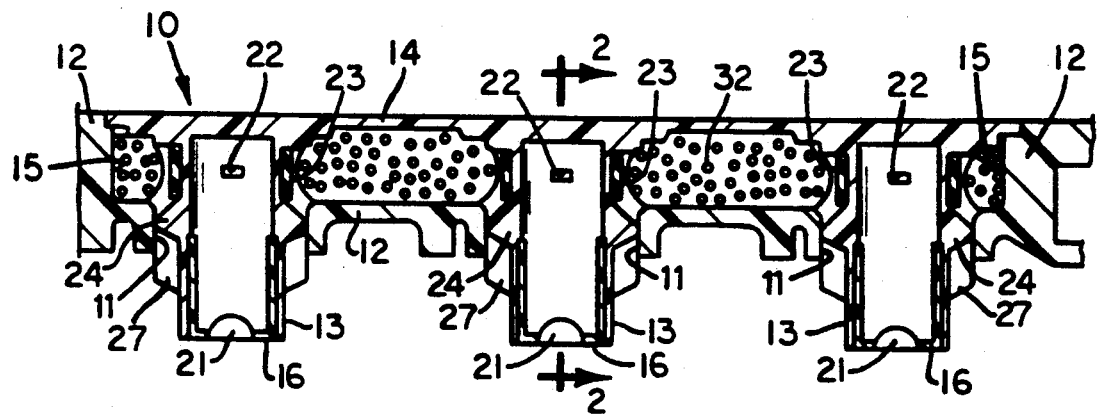
FIG. 1 is a lengthwise sectional view of a ganged vent cap of the invention inserted into a battery vent well.
Figure 3:
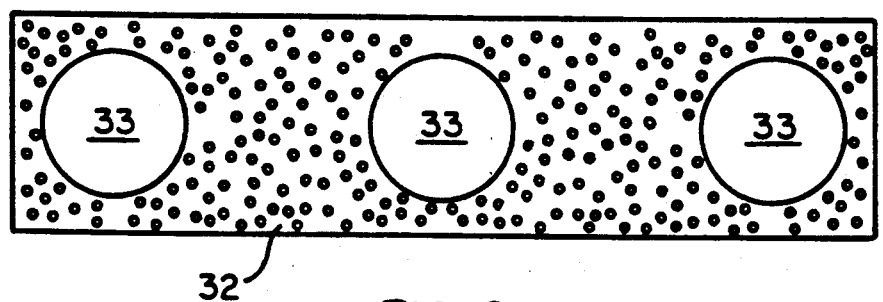
FIG. 3 is a top view of the foam filler piece shown in FIG. 1.

Referring to FIGS. 1-3, a ganged battery vent cap 10 is inserted into inlets 11 of a standard SLI plastic battery case cover 12. Three integral, hollow, plastic barrels 13 extend from a common supporting flange 14 in evenly spaced positions for disposition within three associated inlets 11. The entire vent cap 10 fits into a rectangular recess 15 in battery cover 12 so that flange 14 is flush with or protrudes slightly from the outer surface of cover 12.

A plug 16 is inserted into the open lower end of each barrel 13. Plug 16 has a tubular side wall 17 which is press-fitted securely into the open end of each barrel 13 and a circular bottom wall 18 which is flush with the bottom edge of barrel 13. Bottom wall 18 acts as a splash guard for preventing liquid electrolyte from entering barrel 13. Each plug 16 has semicircular openings 21 at the bottom corner thereof to admit gases from the head space of the battery into barrel 13.

Barrel 13 further has spaced vent apertures 22 extending radially through barrel 13 in the upper half of barrel 13, i.e., the portion that extends out of each inlet 11. A rubber sleeve 23 is fitted in a resiliently stretched condition about the outer surface of each barrel 13 covering apertures 22 so that it acts as a one-way relief valve. Sleeve 23 is preferably made of an ethylene-propylene terpolymer with a Shore A40 diameter. The difference between the unstretched inner diameter of band 23 and the outer diameter of barrel 13 at the location of vents 22 is essential to proper vent performance. For this purpose, the inner diameter of band 23 is preferably 25-30/1000's of an inch smaller than the outer diameter of barrel 13 at that location. To prevent leakage due to imperfections in band 23 or scratches on the outer surface of barrel 13, band 23 is preferably lubricated with an oil, for example, silicone oil having a viscosity of 1000 cps.

Each barrel 13 has a tapered annular flange 24 on its outer surface approximately midway along the length of each barrel 13 between vents 21 and 22. This flange 24 has a slightly greater outer diameter than the inner diameter of the inlets 11 (e.g., 30/1000's of an inch). During installation of cap 10, each edge 26 of flange 24 curls up and forms a knife-edge, gas-tight, compression fitted seal with the inner wall of inlet 11. To ensure a good seal, barrel 13 and flange 24 are integrally molded from a soft, resilient plastic such as polypropylene. This allows vent cap 10 to be repeatedly removed and resealed. Case 12 may be made from the same or different plastic, such as polypropylene or ABS. ABS is too rigid to use to make flange 24. Each barrel 13 further has four integral plastic fins 27 set at 90 degree angles which aid in positioning barrels within inlets 11.

In accordance with the invention, recess 15 surrounding vents 21 and bands 23 between is filled with a pad 32 of explosion attenuation material. In the embodiment shown in FIG. 3, pad 32 has three spaced circular holes 33 through which barrels 13 extend. Pad 32 has a thickness sufficient to provide 30 to 60% compression, preferably 40-50% compression. (50% compression means the pad is compressed to 50% of its original, uncompressed thickness.) Compressing the material improves its explosion attenuating performance. In a typical automotive battery, pad 32 has a thickness in the range of 0.5 to 1 inch.

The nature and physical characteristics of the foam from which pad 32 is made are essential to providing successful attenuation of explosions due to the accumulation of hydrogen and oxygen in recess 15. Pad 32 is made of a polyalkylene foam or fibrous material, particularly polyethylene or polypropylene open-celled foam having from 20 to 90 pores per inch (ppi), preferably 30 to 85 ppi. Other similar plastics, such as polyesters, do not provide adequate explosion attenuation characteristics and/or stability.

A void volume in the range of about 92% to 98% is preferred. In this range porosity is effective for both venting and attenuation purposes. Generally, as the pores per inch of the foam becomes higher, less compression is needed to provide effective attenuation. A low ppi material (20-50 PPI) must have a greater initial thickness than a comparable high ppi material (51-90 PPI) to provide approximately the same performance.

As the tests below demonstrate, porosity and the degree of compression are essential to performance.

It is important to note that pad 32 does not function as a flame arrestor. A polyalkylene foam of the type described above will propagate a flame. It will, however, attenuate an explosion sufficiently to accomplish two essential results. First, in combination with the one-way relief valve, it will prevent an explosion from propagating back into the battery head space where a larger explosion would then occur, possibly causing the entire battery to explode. Second, it can reduce the force of the explosion to an insignificant "pop" that will not cause the vent cap to pop off of the cover.

In operation, gases from the battery head space enter barrel 13 through openings 21. As internal battery pressure increases, pressure builds against rubber bands 23. When a threshold pressure is reached, the internal pressure temporarily overcomes the resilient force of one or more of bands 23, and hydrogen and oxygen gases from the interior of barrel 13 enter recess 15, eventually dissipating past the edge of flange 14. Residual gases that remain in recess 15 can ignite if exposed to a flame or spark, but the resulting explosion is effectively attenuated by pad 32.

In a series of tests, a variety of foam materials were tested by forming ⅜" foam pads as shown in FIG. 3 and inserting them into a battery vent construction as shown in FIGS. 1-2. Hydrogen and oxygen gases were generated in the space 31, and damage to the battery was observed. The following table gives the results, wherein PPI means pores per inch and % CP refers to percent compression:

| EX. | Material | PPI | % CP | Performance |
|---|---|---|---|---|
| 1 | Polyurethane | 80 | 50 | No damage; cap popped; flamed (extinguished) |
| 2 | Polyurethane | 80 | 75 | No damage; produced "pops"* |
| 3 | Polyurethane | 85 | 0 | No damage; produced pops |
| 4 | Polypropylene (pillows)** | n/a | 25 | No damage; produced pops |
| 5 | Polyethylene (foam, closed cell) |  | 0 | No damage; cap blown off completely |
| 6 | Polyethylene (foam, open cell) | 15 | 50 | No damage; cap popped up ⅛" |
| 7 | Polyethylene (foam, open cell) | 30 | 50 | No damage, no pop-up after 10 ignitions |

*Fourth ignition produced an open flame
**Placed in head space below cap, instead of in cover recess Only the polyethylene foam provided consistent explosion attenuation with popping or damage after many repeated ignitions. Polyurethane foam tended to flame and has poor physical stability, that is, tends to settle and collapse after extended use. Sample 3, representing the invention described in Binder et al. U.S. Pat. No. 4,751,154, issued Jun. 14, 1988, illustrates that the explosion attenuation system of the present invention provided a similar degree of protection as the more extensive explosion attenuating system described therein. In general, both polyurethane and PET materials have poor long term physical stability in a lead-acid battery environment, particularly when exposed to high specific gravity sulfuric acid at high temperatures. PET is also difficult to manufacture in the thickness required for purposes of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A vent cap for use in a recombinant battery, comprising:
   a hollow barrel configured for gas-tight insertion into a vent hole in a battery cover, said barrel having an open end and a closed end;

a retaining flange formed at the closed end of the barrel;

a one-way relief valve formed on the barrel near the closed end thereof; and a layer of polyalkylene explosion attenuating material surrounding the outside of said barrel below said flange and in contact with said flange, and surrounding said relief valve.

2. The vent cap of claim 1, wherein the layer cap further comprises a splash guard inserted into the open end of said barrel having openings for admitting gases into the interior of said barrel.

3. The vent cap of claim 1, wherein the one-way relief valve comprises a hole extending radially through said barrel, and a resilient ring mounted on the outside of said barrel over said hole and beneath said explosion attenuating material, which ring temporarily expands under internal gas pressure within said barrel to release gases into said explosion attenuating material.

4. The vent cap of claim 1, wherein said explosion attenuating material comprises a piece of resilient foam having a central hole therein through which said barrel extends.

5. The vent cap of claim 4, wherein said foam is an open-celled foam having from about 20 to 90 pores per inch.

6. The vent cap of claim 5, wherein said foam consists essentially of a polyethylene.

7. The vent cap of claim 1, wherein said layer consists essentially of polypropylene.

8. The vent cap of claim 7, wherein said foam has 30 to 80 pores per inch and a void volume in the range of about 92% to 98%.

9. A battery cover assembly for use in a recombinant battery, comprising:

a cover having a stepped vent hole therein; and a vent cap including a hollow barrel configured for gas-tight insertion into said vent hole, said barrel having an open end and a closed end, a retaining flange formed at the closed end of the barrel, which flange engages an upper surface of said vent hole to retain said vent cap from overinsertion therein, a one-way relief valve formed on the barrel near the closed end thereof, and a layer of polyalkylene explosion attenuating material surrounding the outside of said barrel below said flange and in contact with said flange, which material surrounds said relief valve and substantially fills a space between said barrel, said flange, and said cover at a location above the step in said vent hole.

10. The battery cover assembly of claim 9, wherein said barrel has an annular rib on the outer surface thereof which is in sealing engagement with a wall of said vent hole below said step, and said one-way relief valve comprises a rubber band in resilient engagement with the outer surface of said barrel covering a vent hole.

11. The vent cap of claim 9, wherein said explosion attenuating material comprises a piece of resilient plastic foam having a central hole therein through which said barrel extends.

12. The vent cap of claim 11, wherein said foam is an open-celled, resilient foam having from about 20 to 90 pores per inch and which is under 30 to 60% compression within said space.

13. The vent cap of claim 12, wherein said foam consists essentially of polyethylene.

* * * * *